United States Patent
Lanci et al.

(10) Patent No.: US 10,227,535 B2
(45) Date of Patent: *Mar. 12, 2019

(54) METHOD AND SYSTEM FOR PRODUCING LOW AROMATIC HYDROCARBON PRODUCTS

(71) Applicant: ExxonMobil Research and Engineering Company, Annandale, NJ (US)

(72) Inventors: Michael P. Lanci, Flemington, NJ (US); Stuart L. Soled, Pittstown, NJ (US); Javier Guzman, Kingwood, TX (US); Sabato Miseo, Pittstown, NJ (US); Thomas E. Green, Hamilton, NJ (US); Joseph E. Baumgartner, Califon, NJ (US); Lei Zhang, Basking Ridge, NJ (US); Christine E. Kliewer, Clinton, NJ (US); Lukasz Koziol, Morristown, NJ (US); Kanmi Mao, Clinton, NJ (US); Tracie L. Owens, Houston, TX (US); Gary P. Schleicher, Milford, NJ (US); Xiaochun Xu, Spring, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/198,397

(22) Filed: Jun. 30, 2016

(65) Prior Publication Data
US 2016/0304792 A1 Oct. 20, 2016

Related U.S. Application Data

(63) Continuation-in-part of application No. 14/714,703, filed on May 18, 2015, now Pat. No. 10,023,814.
(Continued)

(51) Int. Cl.
*C10G 45/52* (2006.01)
*C10G 45/00* (2006.01)
(Continued)

(52) U.S. Cl.
CPC .............. *C10G 45/52* (2013.01); *B01J 21/04* (2013.01); *B01J 21/08* (2013.01); *B01J 21/12* (2013.01);
(Continued)

(58) Field of Classification Search
CPC .......... C10G 45/52; C10G 45/00; B01J 31/28; B01J 31/0241
See application file for complete search history.

(56) References Cited

U.S. PATENT DOCUMENTS

| 5,098,684 A | 3/1992 | Kresge et al. |
| 5,183,556 A * | 2/1993 | Reilly .................... C10G 65/08 208/143 |

(Continued)

FOREIGN PATENT DOCUMENTS

| GB | 790476 | * | 2/1958 |
| GB | 790476 A | | 2/1958 |

(Continued)

OTHER PUBLICATIONS

Florida State University (Properties of Solid, 2008, Department of Chemistry, Florida State University).*
(Continued)

*Primary Examiner* — In Suk C Bullock
*Assistant Examiner* — Youngsul Jeong
(74) *Attorney, Agent, or Firm* — Priya G. Prasad; Andrew T. Ward; Joseph E. Wrkich

(57) ABSTRACT

Methods are provided for modifying hydrogenation catalysts having silica supports (or other non-alumina supports) with additional alumina, and using such catalysts to achieve unexpectedly superior hydrogenation of feedstocks. The modified hydrogenation catalysts can have a relatively low cracking activity while providing an increased activity for hydrogenation.

16 Claims, 13 Drawing Sheets

Related U.S. Application Data

(60) Provisional application No. 62/009,373, filed on Jun. 9, 2014.

(51) Int. Cl.

| | | |
|---|---|---|
| *B01J 23/42* | (2006.01) | |
| *B01J 23/44* | (2006.01) | |
| *B01J 21/04* | (2006.01) | |
| *B01J 21/08* | (2006.01) | |
| *B01J 21/12* | (2006.01) | |
| *B01J 23/46* | (2006.01) | |
| *B01J 31/02* | (2006.01) | |
| *B01J 31/28* | (2006.01) | |
| *B01J 37/02* | (2006.01) | |
| *C10G 45/34* | (2006.01) | |
| *C10G 45/46* | (2006.01) | |
| *C10G 65/08* | (2006.01) | |

(52) U.S. Cl.
CPC ............. *B01J 23/42* (2013.01); *B01J 23/44* (2013.01); *B01J 23/464* (2013.01); *B01J 23/468* (2013.01); *B01J 31/0241* (2013.01); *B01J 31/28* (2013.01); *B01J 37/0201* (2013.01); *C10G 45/34* (2013.01); *C10G 45/46* (2013.01); *C10G 65/08* (2013.01); *C10G 2300/202* (2013.01); *C10G 2300/307* (2013.01)

(56) References Cited

U.S. PATENT DOCUMENTS

| | | |
|---|---|---|
| 5,198,203 A | 3/1993 | Kresge et al. |
| 6,288,007 B1 | 9/2001 | Lindblad et al. |
| 6,569,312 B1 | 5/2003 | Carroll et al. |

FOREIGN PATENT DOCUMENTS

| | | | | |
|---|---|---|---|---|
| GB | 1501346 | * | 5/1976 | ............ B01J 23/40 |
| GB | 1501346 A | | 2/1978 | |

OTHER PUBLICATIONS

Environmental Chemistry (Periodic Table of Elements, 2007, Environmental Chemistry).*

The International Search Report and Written Opinion of PCT/US2015/031465 dated Aug. 11, 2015.

Beck, J.S. et al., "A New Family of Mesoporous Molecular Sieves Prepared with Liquid Crystal Templates", Journal of the American Chemical Society, 1992, vol. 114, pp. 10834-10843.

* cited by examiner

|    | Pt/Pd ratio | Pt (wt %) | Pd (wt %) | g Pt | moles Pt | g Pt solution | moles Pd | g Pd solution | moles Pd+Pt |
|----|---|---|---|---|---|---|---|---|---|
| 6a | 1:0 | 0.80 | 0 | 0.16 | 0.00082 | 0.319 | 0 | 0 | 0.000820 |
| 6b | 0:1 | 0 | 0.4365 | 0 | 0.00000 | 0.000 | 0.00082 | 1.027 | 0.000820 |
| 6c | 1:1 | 0.40 | 0.2183 | 0.08 | 0.00041 | 0.160 | 0.00041 | 0.514 | 0.000820 |
| 6d | 3:1 | 0.601 | 0.1085 | 0.1202 | 0.00062 | 0.240 | 0.00020 | 0.255 | 0.000820 |
| 6e | 5:1 | 0.667 | 0.073 | 0.1334 | 0.00068 | 0.266 | 0.00014 | 0.172 | 0.000821 |
| 6f | 1:3 | 0.199 | 0.328 | 0.0398 | 0.00020 | 0.079 | 0.00062 | 0.772 | 0.000820 |
| 6g | 1:5 | 0.127 | 0.368 | 0.0254 | 0.00013 | 0.051 | 0.00069 | 0.866 | 0.000822 |
| 6h | 2:1 | 0.53 | 0.145 | 0.1068 | 0.00055 | 0.213 | 0.00027 | 0.341 | 0.000820 |
| 6i | 1:2 | 0.27 | 0.29 | 0.054 | 0.00028 | 0.108 | 0.00055 | 0.682 | 0.000822 |

FIG. 1

| Example # | Catalyst Description | Temp (°C) | Rate mol/mol_Pt/h | TOF mol/mol_surf/h |
|---|---|---|---|---|
| 2 | Pt(Arg)/SiO₂ Arginine prep. | 300 | 308 | 585 |
| 3a | 1.0% Al₂O₃ IW/Pt(Arg) (Al added to Pt/Si) | 300 | 6895 | 16984 |
| 3b | 2.1% Al₂O₃ IW/Pt(Arg) (Al added to Pt/Si) | 300 | 3429 | 5609 |
| 3b-R | Pt(Arg)/2.1% Al₂O₃ IW/SiO₂ (Pt added to Al/Si) | 300 | 5568 | 16140 |
| 3f | Pt(Arg)/1% Al₂O₃ IW/SiO₂ (Pt added to Al/Si) | 300 | 5621 | 16729 |
| 7 | (1% Al₂O₃ + Pt(Arg)(8.1 to mole Pt)) on SiO₂ coimpregnation | 300 | 3544 | 12479 |

FIG. 9

METHOD AND SYSTEM FOR PRODUCING LOW AROMATIC HYDROCARBON PRODUCTS

CROSS-REFERENCES TO RELATED APPLICATIONS

This application is a continuation-in-part of co-pending U.S. application Ser. No. 14/714,703 titled "Noble Metal Hydrogenation Catalysts with Low Cracking Activity", filed on May 18, 2015, the entirety of which is incorporated herein by reference, which application claims priority to U.S. Provisional Application 62/009,373, titled "Noble Metal Hydrogenation Catalysts with Low Cracking Activity", filed on Jun. 9, 2014.

FIELD

This invention relates to hydrogenation catalysts and methods for using such catalysts.

BACKGROUND

Environmental regulations are requiring lower levels of aromatics in hydrocarbon fuels, and more specifically to lower levels of multi-ring aromatic rings in distillate fuels and heavier hydrocarbon products. The aromatic molecules are responsible for low cetane number in diesel fuel, high smoke point in jet fuels, and particulate emissions in the exhaust gas.

Although further aromatic saturation can be achieved by hydrotreating at higher severity, such an approach may be less desirable for many refineries due to the increased costs. It would therefore be desirable to provide a method and system capable of performing aromatic saturation in a more cost effective manner or while avoiding other disadvantages of current technologies. Furthermore, it would be desirable to provide new systems and methods that increase the volume yield of a hydroprocessing unit.

SUMMARY

In one aspect, a method is provided for hydrogenating a feedstock. The method may include exposing a feedstock comprising a hydrocarbonaceous feed to a supported catalyst under effective hydrogenation conditions to form a hydrogenated effluent, the supported catalyst comprising 0.1 wt % to 5.0 wt % of a Group VIII noble metal on a silica support, the supported catalyst further comprising about 0.3 wt % to about 2.5 wt % alumina deposited on the silica support, the supported catalyst having a ratio of aluminum atoms in tetrahedral sites to octahedral sites of at least 1.0.

BRIEF DESCRIPTION OF THE DRAWINGS

FIG. 1 shows examples of hydrogenation catalysts made using varying amounts of Pd and Pt as hydrogenation metals.

FIG. 9 shows activities for various hydrogenation catalysts.

DETAILED DESCRIPTION OF THE INVENTION

Figure 2:
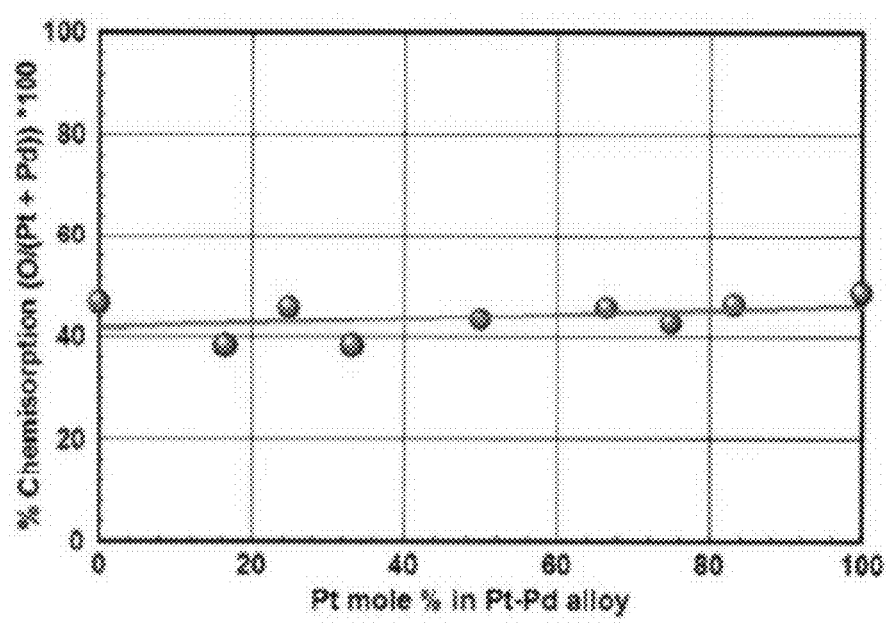
FIG. 2 shows metal dispersion values for various hydrogenation catalysts.

All numerical values within the detailed description and the claims herein are modified by "about" or "approximately" the indicated value, and take into account experimental error and variations that would be expected by a person having ordinary skill in the art.

In various aspects, methods are provided for modifying hydrogenation catalysts having silica supports (or other non-alumina supports) with additional alumina, and using such catalysts to achieve unexpectedly superior hydrogenation of feedstocks. The modified hydrogenation catalysts can have a relatively low cracking activity while providing an increased activity for hydrogenation. This can allow use of the modified hydrogenation catalysts for performing hydrogenation of a feedstock at higher temperatures while causing a reduced/minimized amount of cracking of the feedstock. The modified hydrogenation catalysts also exhibit unexpectedly high activity for performing hydrogenation relative to the activity for an unmodified catalyst and/or a catalyst modified with other different amounts of alumina.

Conventional hydrogenation catalysts can often correspond to catalysts designed to balance a desire for sufficient hydrogenation activity with a conflicting desired for a reduced/minimized activity for catalyzing other types of chemistry, such as cracking of hydrocarbonaceous compounds. A common conventional catalyst to balance these desired activities is a catalyst with a noble metal on a refractory oxide support. Examples of conventional catalysts include catalysts with Pt or Pd supported on a support such as silica, alumina, silica-alumina, or another metal oxide support.

Conventionally, catalysts using a silica support have not been favored due to lower hydrogenation activity and/or low metal dispersion. Use of an alumina or a silica-alumina support can provide increased hydrogenation activity, but at the cost of also increasing the cracking activity of the resulting catalyst. With regard to the choice of hydrogenation metal, Pt has traditionally been considered as offering higher activity than Pd for hydrogenation. However, catalysts including only Pt as a hydrogenation metal have sometimes suffered an undesirable activity loss when used on a feedstock containing moderate (or greater) amounts of sulfur. Pd has been used as hydrogenation metals for aromatic saturation catalysts where environments with higher amounts of sulfur are expected. However, such catalysts have a lower initial activity for hydrogenation due to the reduced activity of Pd. Another option has been to try to use both Pt and Pd, to provide the increased activity of Pt while still obtaining some of the benefit of Pd for tolerating higher sulfur content feedstocks.

In some aspects, it can be desired to provide a catalyst with improved hydrogenation activity where the amount of increase in the corresponding cracking activity of the catalyst can be reduced/minimized. Additionally, in some aspects it can be desired to provide a hydrogenation catalyst that can maintain an activity advantage when used for hydrogenation of a feedstock containing at least about 50 wppm of sulfur, or at least about 100 wppm of sulfur, or at least about 150 wppm of sulfur, or at least about 200 wppm of sulfur, or at least about 250 wppm of sulfur.

In order to at least partially achieve the above desired goals, a catalyst can be provided including a noble metal on a silica substrate, where additional alumina can also be deposited on/impregnated within the substrate. The alumina can be deposited, impregnated, or otherwise placed on the silica substrate in any convenient manner. The alumina can be added to the catalyst prior to addition of the hydrogenation metal, during addition of the hydrogenation metal, or after addition of the hydrogenation metal. The alumina-modified catalyst can provide improved hydrogenation activity for feeds with sulfur contents below about 50 wppm as well as feeds with higher sulfur contents, such as feeds with at least about 100 wppm of sulfur, or at least about 150 wppm of sulfur, or at least about 200 wppm of sulfur, or at least about 250 wppm of sulfur.

In order to achieve an unexpected activity increase, the amount of alumina added to the catalyst can be in a specified range. In some aspects, the amount of alumina added to a catalyst can be about 0.1 wt % to about 3.0 wt %, or about 0.3 wt % to about 3.0 wt %, or about 0.3 wt % to about 2.5 wt %, or about 0.3 wt % to about 2.2 wt %, or about 0.3 wt % to about 2.0 wt %, or about 0.3 wt % to about 1.8 wt %, or about 0.3 wt % to about 1.6 wt %, or about 0.3 wt % to about 1.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %. In particular, the amount of alumina added to the catalyst can be about 0.3 wt % to about 2.5 wt %, or about 1.0 wt % to about 2.2 wt %, or about 1.1 wt % to about 2.1 wt %. For alumina amounts greater than the desired range, some activity enhancement can be produced by addition of alumina. However, the activity enhancement can be substantially lower than the activity enhancement within the specified range. For alumina amounts less than the desired range, the activity of the catalyst can be similar to the activity of a catalyst without added alumina, or alternatively similar to the activity of catalysts having additional alumina amounts greater than the desired range.

Conventionally, it has been believed or suspected that the activity of catalysts with hydrogenation metals deposited on a metal oxide support can be impacted by the amount of dispersion of the hydrogenation metals. Under such a conventional understanding, further impregnation or other deposition of alumina on a catalyst could lead to lower metal dispersion values. However, it has been unexpectedly determined that deposition of alumina on a Pt impregnated catalyst can result in a reduced/minimized impact on the dispersion of the Pt. This high metal dispersion value can be maintained during hydrogenation of a feed.

Described are new systems and methods employing an improved catalyst to reduce the aromatic content, improve the cetane and/or improve the total liquid product of a hydroprocessed hydrocarbon product. Such methods and systems are particularly well suited to the hydroprocessing of distillate fuel products, such as diesel.

Without being bound by theory, it is believed that the inclusion of alumina at the tetrahedral sites creates adsorption sites for increased aromatic surface density on the silica support and may serve as a reservoir of reactants for spilled over hydrogen. This can be supported by Density Functional Theory ("DFT") calculations showing enhanced adsorption stabilization for aromatic compounds with two next nearest neighbor alumina tetrahedral.

Feedstocks

A wide range of petroleum and chemical feedstocks can be suitable for processing by exposing the feedstock to an alumina-modified catalyst under effective conditions for hydrogenation and/or aromatic saturation in accordance with the invention. Suitable hydrocarbonaceous feedstocks can include raw or virgin feeds as well as feeds that have previously been processed (such as hydroprocessed) in one or more reaction stages. Examples of suitable hydrocarbonaceous feedstocks can include, but are not limited to, whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, feeds derived from biological sources, raffinates, naphtha boiling range fractions (boiling range of about 36° C. or about the boiling point of n-pentane to about 177° C.), hydrotreated naphtha boiling range fractions, diesel or other distillate fuel boiling range fractions (about 177° C. to about 370° C.), hydrotreated diesel or other distillate fuel boiling range fractions, lubricant base oil boiling range fractions (about 370° C. to about 538° C.), hydrotreated lubricant base oil boiling range fractions, and mixtures of these materials.

One way of defining a feedstock can be based on the boiling range of the feed. One option for defining a boiling range can be to use an initial boiling point for a feed and/or a final boiling point for a feed. Another option, which in some instances may provide a more representative description of a feed, can be to characterize a feed based on the amount of the feed that boils at one or more temperatures. For example, a "T5" boiling point for a feed is defined as the temperature at which 5 wt % of the feed can boil off. Similarly, a "T95" boiling point is defined as a temperature at which 95 wt % of the feed can boil. It is noted that the boiling ranges noted above can correspond to boiling ranges defined by initial and final boiling points, T5 and T95 boiling points, T10 and T90 boiling points, or combinations thereof. For example, the lubricant base oil boiling range can correspond to an initial, T5, or T10 boiling point of about 370° C. and a final, T95, or T90 boiling point of about 538° C. Similarly, the diesel boiling range can be an initial, T5, or T10 boiling point of about 177° C. and a final, T95, or T90 boiling point of about 370° C. Boiling points, including fractional weight boiling points, can be determined using a suitable ASTM method, such as ASTM D2887. For samples including compounds that cannot be readily characterized using ASTM D2887, an alternative appropriate ASTM method can be used instead, such as ASTM D1160 or ASTM D86.

The sulfur content of the feed can be any convenient amount, but preferably less than about 1000 wppm. In some aspects, the sulfur content of a feed exposed to the hydrogenation catalyst can be about 100 wppm or less, or about 50 wppm or less, or about 25 wppm or less, or about 15 wppm or less. In some aspects, the sulfur content of a feed exposed to a hydrogenation catalyst can be from 0 wppm to about 1000 wppm, or about 500 wppm or less, or about 300 wppm or less. Examples of ranges for sulfur content can include about 30 wppm to about 1000 wppm, or about 50 wppm to about 1000 wppm, or about 100 wppm to about 1000 wppm, or about 200 wppm to about 1000 wppm, or about 250 wppm to about 1000 wppm, or about 30 wppm to about 500 wppm, or about 50 wppm to about 500 wppm, or about 100 wppm to about 500 wppm, or about 200 wppm to about 500 wppm, or about 250 wppm to about 500 wppm, or about 10 wppm to about 1000 wppm, or about 10 wppm to about 500 wppm, or about 50 wppm to about 300 wppm, or about 100 wppm to about 300 wppm, or about 200 wppm to about 300 wppm, or about 10 wppm to about 1000 wppm. In particular, the sulfur content can be about 30 wppm to about 1000 wppm, or about 50 wppm to about 1000 wppm.

In aspects where a process flow can include an initial hydrotreatment process and/or a sour hydrocracking process, a feed can have a sulfur content of at least about 30 wppm. In particular, a feed can have a sulfur content of about 30 wppm to about 20000 wppm, or about 500 wppm to about 10000 wppm, or about 500 wppm to about 5000 wppm. Additionally or alternately, the nitrogen content of a feed can be about 50 wppm to about 4000 wppm, or about 50 wppm to about 2000 wppm.

In some aspects, at least a portion of the feed can correspond to a feed derived from a biocomponent source. In this discussion, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include fat/oils derived from a source such as plants of the genus Jatropha. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds insoluble in water, but soluble in nonpolar (or fat) solvents. Non-limiting examples of such solvents include alcohols, ethers, chloroform, alkyl acetates, benzene, and combinations thereof.

Feeds for the system and method may be distillate feeds, particularly distillate feeds in the diesel boiling range. Diesel boiling range feedstreams suitable for use in the present invention can tend to boil within the range of about 215° F. (about 102° C.) to about 800° F. (about 427° C.). Preferably, the diesel boiling range feedstream can have an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Preferably, the diesel boiling range feedstream has a final boiling point of about 800° F. (about 427° C.) or less, or about 775° F. (about 413° C.) or less, or about 750° F. (about 399° C.) or less. In an embodiment, the diesel boiling range feedstream has a boiling range from about 451° F. (about 233° C.) to about 800° C. (about 427° C.). Additionally or alternately, the feedstock can be characterized by the boiling point required to boil a specified percentage of the feed. For example, the temperature required to boil at least 5 wt % of a feed is referred to as a "T5" boiling point. In one embodiment, the mineral oil feedstock can have a T5 boiling point of at least about 230° F. (about 110° C.), for example at least about 250° F. (about 121° C.) or at least about 275° F. (about 135° C.). Further additionally or alternately, the mineral hydrocarbon feed can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

Particularly useful feedstreams can include sweet diesel feedstreams, such as those having a sulfur content of less than 100 wppm, or less than 25 wppm, or less than 10 wppm. In an exemplary embodiment, the feedstream may be a previously hydroprocessed and fractionated diesel boiling range product.

Improved Hydrogenation Catalyst

In some aspects, a hydrogenation catalyst suitable for treating a feed can comprise, consist essentially of, or be a catalyst composed of one or more Group VIII metals on a silica support modified with alumina, as described in more detail herein. The modification with alumina can provide an unexpected enhancement in the hydrogenation activity of the catalyst.

The supported Group VIII metal(s) can include, but are not limited to, Pt, Pd, Rh, Ir, and combinations thereof. Examples of individual hydrogenation metal embodiments can include, but are not limited to, Pt only or Pd only, while mixed hydrogenation metal embodiments can include, but are not limited to, Pt and Pd, Pt and Rh, or another combination. When only one hydrogenation metal is present, the amount of that hydrogenation metal can be at least about 0.1 wt % based on the total weight of the catalyst, for example at least about 0.3 wt %, or at least about 0.5 wt %, or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 2.0 wt % or less, about 1.5 wt % or less, about 1.0 wt % or less, about 0.9 wt % or less, about 0.75 wt % or less, or about 0.6 wt % or less. Each of the lower and upper bounds identified above for the amount of the only one hydrogenation metal is explicitly contemplated in combination with each other. Thus, for example, the amount of hydrogenation metal can be about 0.1 wt % to about 5.0 wt %, or about 0.1 wt % to about 2.5 wt %, or about 0.1 wt % to about 2.0 wt %, or about 0.1 wt % to about 1.5 wt %, or about 0.3 wt % to about 5.0 wt %, or about 0.3 wt % to about 2.5 wt %, or about 0.3 wt % to about 1.5 wt %, or about 0.5 wt % to about 5.0 wt %, or about 0.5 wt % to about 2.5 wt %, or about 0.5 wt % to about 1.5 wt %. In particular, the amount of hydrogenation metal can be about 0.1 wt % to about 5.0 wt %, or about 0.1 wt % to about 2.0 wt %, or about 0.3 wt % to about 5.0 wt %.

When more than one hydrogenation metal is present, the collective amount of hydrogenation metals can be at least about 0.1 wt % based on the total weight of the catalyst, such as at least about 0.25 wt %, at least about 0.5 wt %, at least about 0.6 wt %, at least about 0.75 wt %, or at least about 1 wt %. Additionally or alternately, when more than one hydrogenation metal is present, the collective amount of hydrogenation metals can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Each of the lower and upper bounds identified above for the combined amount of the hydrogenation metal is explicitly contemplated in combination with each other. Thus, for example, the combined amount of hydrogenation metal can be about 0.1 wt % to about 5.0 wt %, or about 0.1 wt % to about 2.5 wt %, or about 0.1 wt % to about 2.0 wt %, or about 0.1 wt % to about 1.5 wt %, or about 0.3 wt % to about 5.0 wt %, or about 0.3 wt % to about 2.5 wt %, or about 0.3 wt % to about 1.5 wt %, or about 0.5 wt % to about 5.0 wt %, or about 0.5 wt % to about 2.5 wt %, or about 0.5 wt % to about 1.5 wt %. In particular, the amount of hydrogenation metal can be about 0.1 wt % to about 5.0 wt %, or about 0.3 wt % to about 2.5 wt %, or about 0.5 wt % to about 5.0 wt %. For aspects where both Pt and Pd are present as the hydrogenation metals, the ratio of Pt to Pd can be from about 1:3 to about 4:1, or from about 1:4 to about 3:1, or from about 1:2 to about 4:1, or from about 1:2 to about 3:1. The amounts of metal(s) may be measured by methods specified by ASTM for individual metals, including but not limited to atomic absorption spectroscopy (AAS), inductively coupled plasma-atomic emission spectrometry (ICP-AES), or the like.

In some aspects, the silica support can be an amorphous silica support. In other aspects, the support can be a mesoporous crystalline or semi-crystalline support material. Examples of mesoporous silica materials suitable for use as a support can include MCM-41, other M41S structures, SBA-15, and other mesoporous silicas.

The silica support can be modified with alumina to provide an unexpectedly superior activity for performing hydrogenation. The amount of alumina added to the silica support to modify the support can vary depending on the expected sulfur content of the feed for the hydrogenation process.

For general feeds and/or feeds having a sulfur content of about 100 wppm or less, or about 50 wppm or less, the amount of alumina added to the silica support can be about 0.3 wt % to about 3.0 wt %, or about 0.3 wt % to about 2.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %. In particular, the amount of alumina added to the catalyst can be about 0.3 wt % to about 2.5 wt %, or about 1.0 wt % to about 2.5 wt %, or about 1.1 wt % to about 2.2 wt %.

For feeds with sulfur contents of at least about 50 wppm, or at least about 100 wppm, such as a sulfur content of about 1000 wppm of sulfur or less, or about 500 wppm of sulfur or less, the amount of alumina added to the silica support can be about 0.3 wt % to about 3.0 wt %, or about 0.3 wt % to about 2.5 wt %, or about 0.5 wt % to about 3.0 wt %, or about 0.5 wt % to about 2.5 wt %, or about 0.5 wt % to about 2.2 wt %, or about 0.5 wt % to about 2.0 wt %, or about 0.5 wt % to about 1.8 wt %, or about 0.5 wt % to about 1.6 wt %, or about 0.5 wt % to about 1.5 wt %, or about 0.75 wt % to about 3.0 wt %, or about 0.75 wt % to about 2.5 wt %, or about 0.75 wt % to about 2.2 wt %, or about 0.75 wt % to about 2.0 wt %, or about 0.75 wt % to about 1.8 wt %, or about 0.75 wt % to about 1.6 wt %, or about 0.75 wt % to about 1.5 wt %, or about 1.0 wt % to about 3.0 wt %, or about 1.0 wt % to about 2.5 wt %, or about 1.0 wt % to about 2.2 wt %, or about 1.0 wt % to about 2.0 wt %, or about 1.0 wt % to about 1.8 wt %, or about 1.0 wt % to about 1.6 wt %, or about 1.0 wt % to about 1.5 wt %, or about 1.1 wt % to about 3.0 wt %, or about 1.1 wt % to about 2.5 wt %, or about 1.1 wt % to about 2.2 wt %, or about 1.1 wt % to about 2.0 wt %, or about 1.1 wt % to about 1.8 wt %, or about 1.1 wt % to about 1.6 wt %, or about 1.1 wt % to about 1.5 wt %, or about 1.25 wt % to about 3.0 wt %, or about 1.25 wt % to about 2.5 wt %, or about 1.25 wt % to about 2.2 wt %, or about 1.25 wt % to about 2.0 wt %, or about 1.25 wt % to about 1.8 wt %, or about 1.25 wt % to about 1.6 wt %, or about 1.25 wt % to about 1.5 wt %. In particular, the amount of alumina added to the catalyst can be about 0.3 wt % to about 2.5 wt %, or about 1.0 wt % to about 2.2 wt %, or about 1.1 wt % to about 2.1 wt %.

The alumina for modifying the supported catalyst can be added by any convenient method, such as impregnation using a solution containing alumina or a suitable alumina precursor. For example, an alumina precursor can be deposited by aqueous incipient wetness impregnation followed by heating the catalyst to decompose the precursor. The alumina can be added to the catalyst support at any convenient time, such as prior to, during, or after deposition of the hydrogenation metal(s) on the catalyst support. In this description, alumina added to the supported catalyst at any time after formation of the support is defined as alumina deposited on the support and/or the catalyst.

In some aspects, the aluminum atoms added to the silica substrate can be selectively added to tetrahedral coordination sites. For example, when the amount of alumina added corresponds to 0.3 wt % to 2.5 wt %, or 0.3 wt % to 2.2 wt %, or 0.3 wt % to 2.1 wt %, or 0.5 wt % to 2.5 wt %, or 0.5 wt % to 2.2 wt %, or 0.5 wt % to 2.1 wt %, or 1.0 wt % to 2.5 wt %, or 1.0 wt % to 2.2 wt %, or 1.0 wt % to 2.1 wt %, or 1.1 wt % to 2.5 wt %, or 1.1 wt % to 2.2 wt %, or 1.1 wt % to 2.1 wt %, the aluminum atoms added to the silica substrate can be preferentially added to tetrahedral coordination sites as opposed to octahedral coordination sites. The nature of how aluminum atoms are added to a silica substrate can be determined, for example, by $^{27}$Al NMR. When aluminum atoms are selectively added to tetrahedral coordination sites, the ratio of aluminum atoms in tetrahedral sites to octahedral sites can be at least 1.0, or at least 1.5, or at least 2.0. Without being bound by any particular theory, it is believed that preferential incorporation of aluminum atoms into tetrahedral coordination sites can allow for preferential incorporation of aluminum in a lower acidity manner that can provide enhanced aromatic saturation activity without substantially modifying the reduced cracking activity provided by the silica support. For example, acidic Al atoms can potentially create adsorption sites to provide increased aromatic compound surface density on the silica support and/or to serve as a reservoir of reactants for available hydrogen.

Hydrogenation or aromatic saturation conditions can include temperatures from about 25° C. to about 425° C., such as about 75° C. to about 425° C., or about 100° C. to about 425° C., for example about 180° C. to about 280° C.; a hydrogen partial pressure from about 100 psi (0.7 MPa) to about 3000 psi (~20.7 MPa), preferably about 500 psi (~3.4 MPa) to about 2500 psi (~17.2 MPa); and a liquid hourly space velocity from about 0.1 hr$^{-1}$ to about 5 hr$^{-1}$ LHSV, preferably about 0.5 hr$^{-1}$ to about 1.5 hr$^{-1}$. Additionally, a hydrogen treat gas rate of from about 36 Sm$^3$/m$^3$ to about 1780 Sm$^3$/m$^3$ (~200 SCF/B to ~10000 SCF/B) can be used.

Systems and Methods for Producing Improved Diesel Products

Systems and methods for improving a diesel product generally may include treating an aforementioned feedstream with one the aforementioned catalysts under conditions suitable for reducing the aromatic content, increasing the cetane and/or increasing the total liquid product of the processed hydrocarbon product.

In addition to aromatic saturation using a catalyst corresponding to a noble metal (or metals) on an alumina-modified silica support, a variety of other types of hydroprocessing can be used during diesel production. Examples of suitable processes for forming a hydroprocessed effluent including diesel boiling range products can include hydrotreating, hydrofinishing, dewaxing, and fractionation processes. When hydrotreating is used for substantial sulfur removal, a gas-liquid separator may be used to remove gas phase contaminants from the liquid effluent at one or more locations within the process flow.

Hydrotreatment can typically be used to reduce the sulfur, nitrogen, and aromatic content of a feed and/or to improve the viscosity index of a hydrotreated product. Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); Liquid Hourly Space Velocities (LHSV) of 0.2-10 h$^{-1}$; and hydrogen treat rates of 200 scf/B (36 Sm$^3$/m$^3$) to 10000 scf/B (1780 Sm$^3$/m$^3$), or 500 scf/B (89 Sm$^3$/m$^3$) to 10000 scf/B (1780 Sm$^3$/m$^3$). Although hydrotreatment can often be performed for sulfur and/or nitrogen removal, in some aspects, hydrotreatment can be performed under what could be considered as "sweet" conditions, or alternatively "non-sour" conditions, where the sulfur content of the feed entering the hydrotreatment stage can be 500 wppm or less, or 200 wppm or less. Hydrotreatment in a non-sour and/or sweet stage can still be effective for reducing the amount of sulfur, nitrogen, and/or aromatics in a feed. The hydrotreating conditions noted above can be effective for hydrotreatment under sweet conditions or non-sour conditions, although the conditions may tend to have lower severity than hydrotreatment conditions for a comparable boiling range feed with a higher sulfur content.

Hydrotreating catalysts can typically be those containing Group VIB metals, such as molybdenum and/or tungsten, and non-noble Group VIII metals, such as, iron, cobalt and/or nickel. These metals or mixtures of metals can typically be present as oxides or sulfides on refractory metal oxide supports. Suitable metal oxide supports include low acidic oxides such as silica, alumina, or titania. Preferred aluminas can be porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. The supports can preferably not be promoted with a halogen such as fluorine, as this can generally increase the acidity of the support. Preferred metal catalysts can include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina. Alternatively, the hydrotreating catalyst can be a bulk metal catalyst, or a combination of stacked beds of supported and bulk metal catalyst.

In some embodiments, a separator can be used between the first and second stages of the hydroprocessing reaction system that can also perform at least a partial fractionation of the effluent from the first stage. In these types of embodiments, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In embodiments where the inter-stage separator can also be used to produce a distillate fuel fraction, the portion boiling below the distillate fuel fraction can include naphtha boiling range molecules, light ends, and contaminants such as H$_2$S. These different products can be separated from each other in any convenient manner. Similarly, one or more distillate fuel fractions can be formed, if desired, from the distillate boiling range fraction. In such embodiments, the portion boiling above the distillate fuel range can be subjected to further hydroprocessing in a second hydroprocessing stage.

In some embodiments, a dewaxing catalyst can also be included as part of the process train generating the input feed. Typically, the dewaxing catalyst can be located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst.

Suitable dewaxing catalysts can include molecular sieves such as crystalline aluminosilicates (zeolites). In an embodiment, the molecular sieve can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, molecular sieves selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials can include EU-2, EU-11, ZBM-30, ZSM-48, and/or ZSM-23. ZSM-48 can be particularly preferred. Note that a zeolite having the ZSM-23 structure with a silica to alumina ratio of from 20:1 to 40:1 can sometimes be referred to as SSZ-32. Other molecular sieves isostructural with the above materials can include Theta-1, NU-10, EU-13, KZ-1, and NU-23. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts can include/be catalysts with a low ratio of silica to alumina. For example, for ZSM-48, the ratio of silica to alumina in the zeolite can be less than 200:1, or less than 150:1, or less than 110:1, or less than 100:1, or less than 90:1, or less than 80:1. In various embodiments, the ratio of silica to alumina can be from 30:1 to 200:1, or 60:1 to 110:1, or 70:1 to 100:1.

In various embodiments, the dewaxing catalysts can further include a metal hydrogenation component. The metal hydrogenation component can typically be a Group VI and/or a Group VIII metal. Preferably, the metal hydrogenation component can be a Group VIII noble metal. Preferably, the metal hydrogenation component can be Pt, Pd, or a mixture thereof. In an alternative preferred embodiment, the metal hydrogenation component can be a combination of a non-noble Group VIII metal with a Group VI metal. Suitable combinations can include Ni, Co, and/or Fe with Mo and/or W, particularly Ni with Mo and/or W.

The metal hydrogenation component may be added to the catalyst in any convenient manner. One technique for adding the metal hydrogenation component can be by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, e.g., where a metal precursor is added to a mixture of zeolite (or zeolite and binder) prior to extrusion.

The amount of metal in the catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For embodiments where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts can also include a binder. In some optional embodiments, the dewaxing catalysts can be formulated using a low surface area binder, a low surface area binder represents a binder with a surface area of 100 m$^2$/g or less, or 80 m$^2$/g or less, or 70 m$^2$/g or less.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Process conditions in a catalytic dewaxing zone can include a temperature of from 200 to 450° C., preferably 270 to 400° C., a hydrogen partial pressure of from 1.8 to 34.6 MPa (250 to 5000 psi), preferably 4.8 to 20.8 MPa, a liquid hourly space velocity of from 0.2 to 10 v/v/hr, preferably 0.5 to 3.0 v/v/hr, and a hydrogen circulation rate of from 36 to 1780 Sm$^3$/m$^3$ (200 to 10000 scf/B), preferably 178 to 891 Sm$^3$/m$^3$ (1000 to 5000 scf/B). In still other aspects, the conditions can include temperatures in the range of 600° F. (343° C.) to 815° F. (435° C.), hydrogen partial pressures of from 500 psi to 3000 psi (3.5 MPa to 20.9 MPa), and hydrogen treat gas rates of from 213 Sm$^3$/m$^3$ to 1070 Sm$^3$/m$^3$ (1200 SCF/B to 6000 SCF/B).

Sample Configuration—Diesel Production

In any embodiment, the method for improving a diesel product can include processing a feedstream with a first catalyst under first hydroprocessing conditions to produce a hydrotreated product; fractionating the hydrotreating product to obtain a hydrotreated diesel feedstream; and processing the hydrotreated diesel feedstream with a second catalyst under second hydroprocessing conditions to produce a diesel product having an increased the cetane index of the diesel product relative to the hydrotreated diesel feedstream. The improvement in cetane may be at least 3.0 as calculated by ASTM D976, at least 3.5 as calculated by ASTM D4737 Procedure A, at least 3.7 as calculated by ASTM D4737 Procedure B, by at least 3.7, or any combination thereof.

In any embodiment, the aromatic content of the hydrotreated diesel feedstream may be reduced by 40 wt %, or 60 wt %, or 90 wt % after treatment with the second catalyst. For example, the hydrotreated diesel feedstream may be at least 20 wt %, or at least 30 wt %, or at least 50 wt %, or in the range of 20 wt % to 50 wt %, or 20 wt % to 60 wt %, or 20 wt % to 80 wt %. The aromatic content of the diesel product may be less than 30 wt %, or less than 20 wt %, or less than 10 wt %, or in the range of 5 wt % to 30 wt %, or 5 wt % to 20 wt %, or 5 wt % to 10 wt %.

In any embodiment, the total liquid product of the hydrotreated diesel feedstream may be increased by a volume swell of at least 1.6% or at least 1.7% or at least 1.8% or in the range of 1.6% to 3%, or 1.6% to 2.5%, or 1.6 to 2%, or 1.6% to 1.9%, or 1.6% to 1.8%, or 1.7% to 3%, or 1.7% to 2.5%, or 1.7 to 2%, or 1.7% to 1.9%, or 1.7% to 1.8% after treatment with the second catalyst.

Figure 10:
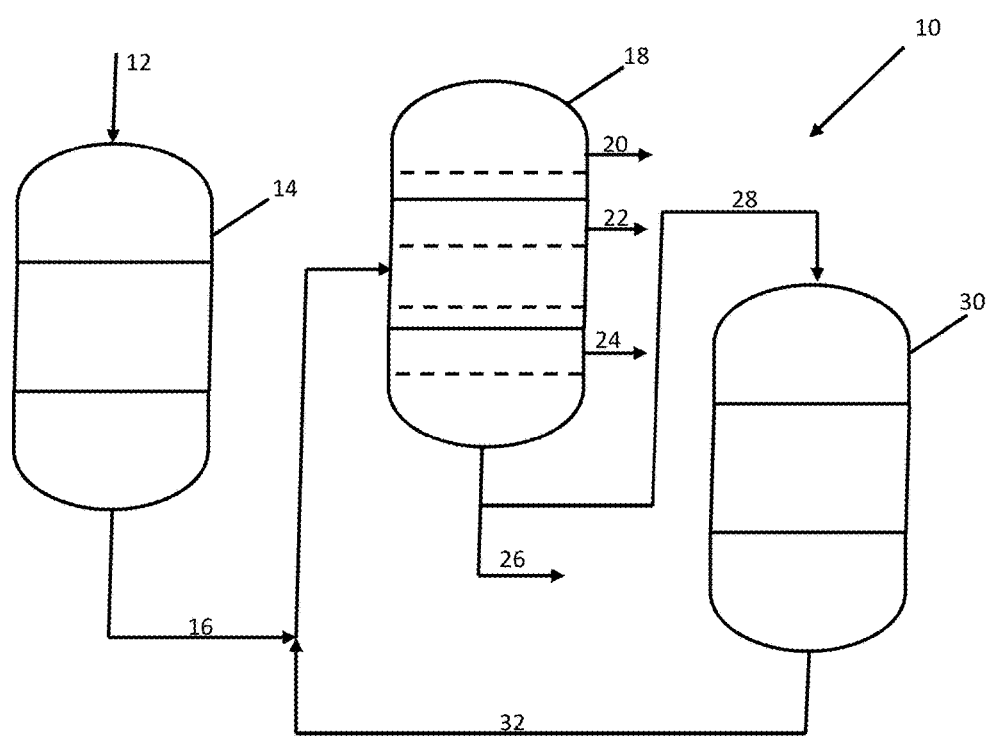
FIG. 10 schematically shows an example of a process flow for diesel production.

An exemplary embodiment is illustrated in FIG. 10. Feedstream 12, which may be a feedstream boiling in the diesel range, can be fed to a first reactor 14 containing a first catalyst operating under first hydroprocessing conditions. For example, the first reactor 14 may contain a base metal hydrotreating catalyst. The catalyst may include, for example, a NiMo or CoMo catalyst. The first hydroprocessing conditions may be conditions suitable for reducing the sulfur content of the feedstream 12 to a desired or specified level, e.g., to convert feedstream 12 to a sweet diesel product.

The hydrotreated product 16 can then be fed to a product fractionator 18, where lower boiling point products, such as light naphtha 20, heavy naphtha 22, and jet 24 may be taken out leaving a diesel product 26. All or a portion of the diesel product may be fed as hydrotreated diesel feedstream 28 to a second reactor 30 which contains a second catalyst operating under second hydroprocessing conditions. The second catalyst may be any of the catalysts described herein. For example, it may be supported catalyst comprising 0.1 wt % to 5.0 wt % of a Group VIII noble metal on a silica support and about 0.3 wt % to about 2.5 wt % alumina deposited on the silica support, the supported catalyst having a ratio of aluminum atoms in tetrahedral sites to octahedral sites of at least 1.0. The second hydroprocessing conditions may be conditions suitable for reducing the aromatic content, increasing the cetane and/or increasing the total liquid product of the processed hydrocarbon product of the hydrotreated diesel feedstream 28 to a desired or specified level. The resulting second-stage diesel product 32 may be recycled to product fractionator 18 to separate lighter components.

Although it has been discovered that the present system can be used to improve the cetane, aromatic saturation, and/or volume swell of a diesel feed, it is noted that the disclosed system can also be employed to produce an equivalent product (e.g., without improvement in cetane) while requiring less catalyst in reactor 14 or by allowing reactor 14 to be operated at lower severity.

ADDITIONAL EMBODIMENTS

Embodiment 1

A method for hydrogenating a feedstock, comprising: exposing a feedstock comprising a hydrocarbonaceous feed to a supported catalyst under effective hydrogenation conditions to form a hydrogenated effluent, the supported catalyst comprising 0.1 wt % to 5.0 wt % of a Group VIII noble metal on a silica support, the supported catalyst further comprising about 0.3 wt % to about 2.5 wt % alumina deposited on the silica support, the supported catalyst having a ratio of aluminum atoms in tetrahedral sites to octahedral sites of at least 1.0.

Embodiment 2

The method of any other Embodiment, wherein the hydrocarbonaceous feed comprises a diesel boiling range portion.

Embodiment 3

The method of any other Embodiment, wherein the hydrocarbonaceous feed comprises about 50 wppm of sulfur or less.

Embodiment 4

The method of any other Embodiment, wherein the catalyst comprises about 0.3 wt % to about 2.1 wt % alumina deposited on the silica support.

Embodiment 5

The method of any other Embodiment, wherein the catalyst comprises about 0.5 wt % to about 2.2 wt % alumina deposited on the silica support.

Embodiment 6

The method of any other Embodiment, wherein the effective hydrogenation conditions comprise a temperature from about 75° C. to about 425° C.; a hydrogen partial pressure from about 100 psig (0.7 MPa) to about 3000 psig (20.7 MPa); a liquid hourly space velocity from about 0.1 $hr^{-1}$ to about 5 LHSV; and a hydrogen treat gas rate of from about 35.6 $m^3/m^3$ to about 1781 $m^3/m^3$ (200 SCF/B to 10,000 SCF/B).

Embodiment 7

The method of any other Embodiment, wherein the Group VIII noble metal comprises Pt.

Embodiment 8

The method of Embodiment 7, wherein the Group VIII noble metal further comprises one or more of Pd, Ir, or Rh, a molar ratio of Pt to the one or more of Pd, Ir, or Rh being at least about 1:1.

Embodiment 9

The method of any other Embodiment, further comprising: processing a stream with a second catalyst under second hydroprocessing conditions to produce a hydrotreated product; and fractionating the hydrotreating product to obtain the hydrocarbonaceous feed exposed to the supported catalyst.

Embodiment 10

The method of any other Embodiment, wherein the hydrocarbonaceous feed is exposed to the supported catalyst under conditions to produce a diesel product having an increased cetane index relative to the hydrocarbonaceous feed, calculated by ASTM D976, by at least 3.0.

Embodiment 11

The method of any other Embodiment, wherein the hydrocarbonaceous feed is exposed to the supported catalyst under conditions to produce a diesel product having an increased cetane index relative to the hydrocarbonaceous feed, calculated by ASTM D4737 Procedure A, by at least 3.5.

Embodiment 12

The method of any other Embodiment, wherein the hydrocarbonaceous feed is exposed to the supported catalyst under conditions to produce a diesel product having an increased cetane index relative to the hydrocarbonaceous feed, calculated by ASTM D4737 Procedure B, by at least 3.7.

Embodiment 13

The method of any other Embodiment, wherein the hydrocarbonaceous feed has an aromatic content of at least 30 wt %.

Embodiment 14

The method of any other Embodiment, wherein the hydrocarbonaceous feed is exposed to the supported catalyst under conditions to produce a diesel product having an aromatic content of about 5 wt % to about 30 wt %.

Embodiment 15

The method of any other Embodiment, wherein the hydrocarbonaceous feed has a T5 boiling point of at least 110° C.

Embodiment 16

The method of any other Embodiment, wherein the hydrocarbonaceous feed is exposed to the supported catalyst under conditions to produce a diesel product having a volume swell of at least 1.6% relative to the hydrocarbonaceous feed.

EXAMPLES

The following examples provide information to illustrate various aspects of the invention. In the following examples, unless otherwise indicated, the catalyst is a silica supported catalyst with Pt added as a hydrogenation metal. The Pt was impregnated by incipient wetness onto a silica support available from Davison. The silica support had a surface area of about 290 m²/g, an average pore diameter of about 150 Å, a ~35-60 mesh size, and an incipient wetness pore volume of about 1.1 cc/g. In each example the Pt precursor used was a tetraammineplatinum(II) nitrate containing about 50.1% wt. of Pt. The various examples were designed as aqueous preparations. Some of the supported catalysts were prepared by dissolving the tetraammineplatinum(II) nitrate in water and adding it by incipient wetness to the silica. These catalysts were then dried at about 100° C. and calcined to different temperatures as indicated. For other catalysts, the amino acid arginine (arg) was added to the impregnation solution as a bifunctional organic dispersant. The amount of arginine added was such that the arginine to Pt mole ratio was about 8:1. The arginine was dissolved in the aqueous solution containing tetraammineplatinum(II) nitrate, and this liquid was impregnated by incipient wetness onto the silica support and dried at about 100° C. These arginine impregnated catalysts were then calcined to about 425° C. to decompose the organic. For the catalysts with impregnated alumina, the alumina was added by aqueous incipient wetness impregnation of aluminum nitrate, which was then decomposed at about 375° C. Depending on the sample, alumina was added either after, during, or before the Pt addition. Thermogravimetric Differential Thermal Analysis (TG/DTA) scans at programmed heating rates of ~4° C./min were used to monitor the sequential decomposition of the complexes. Oxygen chemisorption was used to measure the number of surface metal sites.

Example 1a. ~0.8% Pt/SiO₂

About 0.319 g of Pt tetrammine nitrate (containing ~50.1 wt % of Pt) was dissolved into deionized water to a final volume of about 22 cc and this resulting solution was added by incipient wetness to ~19.84 g of a silica support. The sample was dried at ~100° C. overnight (~8-16 hours) and then heated according to a temperature program at ~0.5° C./min to ~350° C. and held at ~350° C. for about 4 hours. The calcined sample was denoted as Pt (H₂O)/SiO₂.

Example 1b. ~0.8% Pt/Al₂O₃

A sample similar to Example 1a was prepared that used an alumina support composed of Versal™ 300 alumina (available from UOP) in place of the silica support. The calcined sample was denoted as Pt/Al₂O₃.

Example 2. ~0.8% Pt/SiO₂ with Arginine

About 0.319 g of Pt tetrammine nitrate (containing ~50.1 wt % of Pt) and ~1.143 g of arginine were dissolved in deionized water such that the total solution volume was about 22 cc. This solution was impregnated by incipient wetness onto ~19.84 g of a silica support. The sample was dried at ~100° C. overnight (~8-16 hours), and the dried samples were calcined in a box furnace with a heating rate of ~0.5° C./min to ~425° C. and held at that temperature about four hours. This was believed to be sufficient to substantially completely oxidize the arginine.

Example 3b. ~2.1% Al₂O₃ Impregnated on ~0.8% Pt/SiO₂ with Arginine

About 2.94 g of aluminum nitrate nonahydrate was dissolved in distilled water to give a solution volume of about 22 cc. About 19.6 g of the catalyst in Example 2 was impregnated by incipient wetness using the alumina nitrate solution. The sample was dried overnight (~8-16 hours) at ~100° C. and then heated at ~0.5° C./min to ~375° C. and held at that temperature for ~4 hours.

Example 3a-3e

Samples similar to that described in Example 3b but with varying loadings of alumina on the catalyst were prepared. Table 1 lists the catalysts which contained ~0.8% Pt on silica to which alumina in varying amounts was added by incipient wetness followed by calcination.

TABLE 1

| Samples of ~0.8% Pt/SiO₂ With Added Al₂O₃ | | | | |
|---|---|---|---|---|
| | For ~20 g catalyst | | | |
| Sample # | wt % | g Al2O3 | g Pt/SiO2 | g Al |
| 3a | ~1.0 | ~0.20 | ~19.8 | ~1.47 |
| 3b | ~2.1 | ~0.40 | ~19.6 | ~2.94 |
| 3c | ~3.0 | ~0.60 | ~19.4 | ~4.42 |
| 3d | ~6.8 | ~1.36 | ~18.6 | ~10.0 |
| 3e | ~16.8 | ~3.36 | ~16.6 | ~24.7 |

Example 4. ~0.8% Pt/SiO₂ with Arginine Impregnated onto ~2% Al₂O₃/SiO₂ Support (Reverse Sequence)

Synthesis of a catalyst similar to Sample 3b was repeated but the sequence of the addition of Pt and alumina was reversed. About 2.94 g of aluminum nitrate nonahydrate was dissolved in distilled water to give a solution volume of about 22 cc. The alumina nitrate solution was impregnated by incipient wetness onto ~19.6 grams of silica support. After overnight (~8-16 hours) drying at ~100° C., the sample was calcined at ~0.5° C./min to ~375° C. and held at ~375° C. for about four hours. ~0.319 g of Pt tetrammine nitrate (containing 50.1 wt % of Pt) and ~1.143 g of arginine were dissolved in deionized water such that the total solution volume was about 22 cc. This solution was impregnated by incipient wetness onto ~19.84 g of the "2% Al₂O₃ on silica" prepared in the first step of this example, dried at ~100° C. overnight (~8-16 hours), heated at ~5° C./min to ~425° C., and held at that temperature for about four hours. This sample is referred to herein as Sample 3b-R.

Example 5. Additional Catalyst Samples

For Sample 5a, a catalyst similar to Sample 3a was prepared, but the catalyst was prepared without the use of Arginine as an organic additive.

For Sample 5b, a catalyst was prepared according to Example 6b (see below), with ~1.0 wt % added alumina.

For Samples 5c and 5d, catalysts similar to Samples 3a and 3b were prepared, but Pt was impregnated on the catalyst after deposition of the $Al_2O_3$, as opposed to impregnating with Pt prior to deposition of the $Al_2O_3$.

For Sample 5e, a catalyst was prepared according to Example 6e (see below) with ~1.0 wt % of added alumina.

For Sample 5f, a catalyst similar to Sample 3a was prepared, but Pt was impregnated at the same time as deposition of the $Al_2O_3$.

For Samples 5g and 5h, a catalyst was prepared according to Example 6g (see below). Sample 5g had ~1.0 wt % added alumina, while Sample 5h had ~2.0 wt % added alumina.

Examples 6a-6i. Pt—Pd Alloy Series on Silica

For Examples 6a-6i, the steps in example 2 were followed, but with co-mixing of the ~50.1 wt % Pt tetrammine nitrate solution with a tetraammine Pd nitrate solution of ~8.5% Pd content in varying amounts. The solutions were used to impregnate about ~19.9 g of silica support by incipient wetness. The arginine to total (Pt+Pd) molar ratio was kept at about 8:1, and all the samples had about the same molar content of (Pt+Pd). This corresponded to having about ~1.14 g of arginine on the catalyst support prior to calcination. All calcinations were performed in a manner similar to example 2. FIG. 1 provides the details for the Pt—Pd/$SiO_2$ catalysts (optionally with alumina modification) made using this procedure.

Example 7. ~0.8% Pt+~1% $Al_2O_3$ Co-Impregnated onto $SiO_2$ with Arginine

A catalyst similar to sample 3a was prepared except that the alumina and platinum precursors were commixed and coimpregnated. The arginine content was maintained at ~8:1 moles arginine/moles Pt. In this preparation, ~0.74 g of aluminum nitrate, ~0.16 g of Pt tetraammine nitrate (containing ~50.1 wt % of Pt) solution, and ~0.57 g of arginine were mixed into an aqueous solution of water adjusted to 10 cc. This was impregnated in a single step onto ~9.9 g of silica. The dried sample was calcined in a box furnace with a heating rate of ~0.5° C./min to ~425° C. and held at that temperature for about four hours.

Example 8. Silica-Alumina Comparative Catalysts

Comparative Samples 8a and 8b were composed of Pt supported on a commercially available amorphous silica-alumina support obtained from Grace Davison (~75 wt % $SiO_2$ and ~25 wt % $Al_2O_3$). For Sample 8a, Pt was impregnated on to the silica-alumina support in a manner similar to sample 1 (aqueous preparation using tetrammine Pt nitrate).

Sample 8b contained ~1.7 wt % Pt was prepared by the method of selective electrostatic adsorption. In the preparation of sample 10c, 2.25 g of a ~7.33% solution of tetrammine Pt hydroxide was diluted with water to make a total solution volume of about 100 cc. The resulting pH of the solution was ~11.4. About 10 g of the $SiO_2$—$Al_2O_3$ support material was suspended in the Pt solution and ammonium hydroxide was slowly added to the solution in order to maintain the pH at ~10. The sample was filtered and dried overnight (~8-16 hours) at ~100° C. and then heated at ~0.5° C./min to ~375° C. and held at that temperature for ~4 hours.

Example 9. Measurement of Chemisorption Properties

Chemisorption measurements were obtained under static high vacuum conditions on a Quantachrome Autosorb 1A instrument. About 0.2-0.4 g of catalyst was reduced in flowing hydrogen and heated at ~2° C./min to the final reduction temperature and held at that temperature for ~2 hours. Following reduction, the sample was evacuated (while still at the reduction temperature) with a turbomolecular pump for ~30 minutes to remove any chemisorbed hydrogen. With the sample still under vacuum, the temperature was lowered to ~40° C. and held isothermal during subsequent treatments. An 8-point isotherm (with pressures between ~80 and ~400 torr) was measured at ~40° C. with $O_2$ as the adsorbent molecule. The weak (or back) O isotherms reflected near zero oxygen uptake on the support and near zero multiple layer oxygen on the metals.

Figure 3:
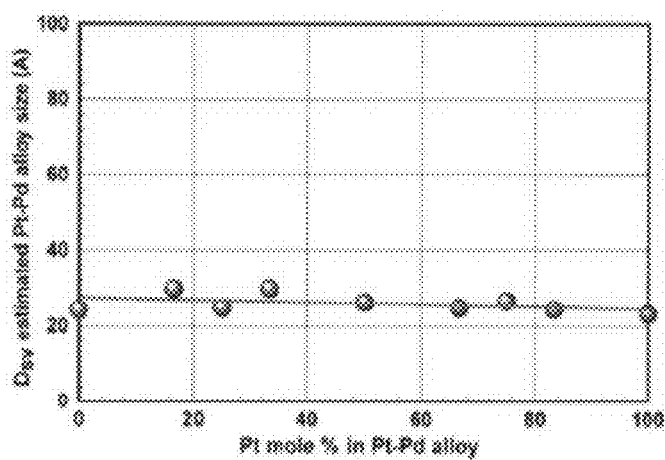
FIG. 3 shows calculated particle size values for various hydrogenation catalysts.

The oxygen chemisorption values of the catalysts prepared according to Example 6 were measured, and the results are shown in FIG. 2. The plot shown in FIG. 2 is believed to represent a percentage of metal dispersion, as the amount of O chemisorbed is believed to be proportional to the amount of surface Pt and Pd adsorption sites. The calculated metal particles sizes for the catalysts prepared in Example 6 are shown in FIG. 3. It is noted that the metal particle sizes were similar in all the samples and ranged from ~2.5-3 nm. Chemisorption data was also collected for other samples. The metal dispersion values for the additional samples are shown in Table 2. It is noted that, in Table 2, the amount of Pt or Pd supported on the catalysts was about 0.8 wt % for all samples except for 8a (~1 wt % Pt), and 8b (~1.7 wt % Pt).

TABLE 2

Metal Dispersion Values

| Sample # | Catalyst Description | % Metal Dispersion |
|---|---|---|
| 2 | Pt(Arg)/$SiO_2$ Arginine prep. | ~52.1 |
| 2 repeat | Pt(Arg)/$SiO_2$ Arginine prep. repeat | ~44.9 |
| 1a | Pt($H_2O$)/$SiO_2$ Aqueous prep. | ~39.7 |
| 1b | Pt/$Al_2O_3$ Aqueous prep. | ~33.1 |
| 3a | Pt(Arg)/$SiO_2$ + 1.0% $Al_2O_3$ post impreg | ~40.6 |
| 3b | Pt(Arg)/$SiO_2$ + 2.1% $Al_2O_3$ post impreg | ~43.3 |
| 3c | Pt(Arg)/$SiO_2$ + 3.0% $Al_2O_3$ post impreg | ~37.0 |
| 3d | Pt(Arg)/$SiO_2$ + 6.8% $Al_2O_3$ post impreg | ~43.4 |
| 3e | Pt(Arg)/$SiO_2$ + 16.8% $Al_2O_3$ post impreg | ~41.7 |
| 8a | Pt(Arg)/amorphous Silica-Alumina (75-25) | ~30.9 |
| 8b | Pt/Amorphous Silica-Alumina (75-25) selective electrostatic adsorption | ~56.1 |
| 5a | Pt($H_2O$)/$SiO_2$ + 1.0% $Al_2O_3$ post impreg | ~32.7 |
| 5c | Pt(Arg)/1% $Al_2O_3$ IW/$SiO_2$ (Pt added to Al/Si) | ~33.6 |
| 5d | Pt(Arg)/2% $Al_2O_3$ IW/$SiO_2$ (Pt added to Al/Si) | ~34.5 |
| 5f | (1% $Al_2O_3$ + Pt(Arg)) on $SiO_2$ coimpregnation | ~28.4 |
| 6g | 5Pd:1Pt(Arg) | ~38.2 |
| 5g | 2.0% $Al_2O_3$/5Pd:1Pt(Arg) | ~19.2 |
| 6b | Pd(Arg) | ~46.6 |
| 5b | 1.0% $Al_2O_3$/Pd(Arg) | ~21.3 |
| 6e | 1Pd:5Pt(Arg) | ~45.3 |
| 5e | 1.0% $Al_2O_3$/1Pd:5Pt(Arg) | ~36.2 |

Based on the data in Table 2, it appears that, for Pt on silica, an appreciable effect on the chemisorption values was not observed with the addition of the alumina by impregnation. The highest dispersed sample on silica-alumina was obtained on the sample prepared by selective electrostatic adsorption (sample 8b). For Pd on silica, it appears that the chemisorption values were impacted by the addition of alumina, as shown by the strong difference in chemisorption values for samples 5g (~5:1 Pd to Pt) and 5b (all Pd). For sample 5e with a lower amount of Pd (~1:5 Pd to Pt), addition of alumina produced a more modest reduction in metal dispersion.

Example 10. 2-Methylpent-2-ene Acidity Test

A variety of samples were evaluated for acidity using a 2-methylpent-2-ene (2MP2) isomerization test. The formation rates and rate ratios of the product hexene isomers of this test reaction reflected the relative acid site concentrations. The product hexene isomers formed include 4-methylpent-2-ene (4MP2), t-3-methylpent-2-ene (t-3MP2), and 2,3 dimethylbute-2-ene (2,3 DMB2). 4MP2 requires only a double bond shift, a reaction occurring on weak acid sites. 3MP2 requires a methyl group shift (i.e., a stronger acidity requirement than double bond shift), whereas the double branched 2,3DMB2 product requires even stronger acidity. For a homologous series of solid acids, differences in t-3MP2 rates normalized with respect to 4MP2 reflected the density of acid sites possessing strengths sufficient to catalyze skeletal isomerization. The isomerization of 2-methylpent-2-ene was conducted by flowing a helium stream containing ~7 mol % olefin at ~101 kPaa (atmospheric pressure) at a rate of ~150 cm$^3$/min over ~1 g of catalyst contained in a ~22 cm$^3$ stainless-steel reactor. The reaction products were analyzed after reaction at ~1 and ~2 hours at ~250° C., then after ~1 additional hour at ~350° C., and finally after ~1 more hour at ~250° C. Catalysts were pretreated in flowing helium for about ~1 hr at ~500° C. before use. Products were analyzed with an on-line Varian™ 3700 gas chromatograph containing a 50-m capillary column which was able to resolve all 17 hexene isomers. The capillary column was coated with SP-2100.

Figure 4:
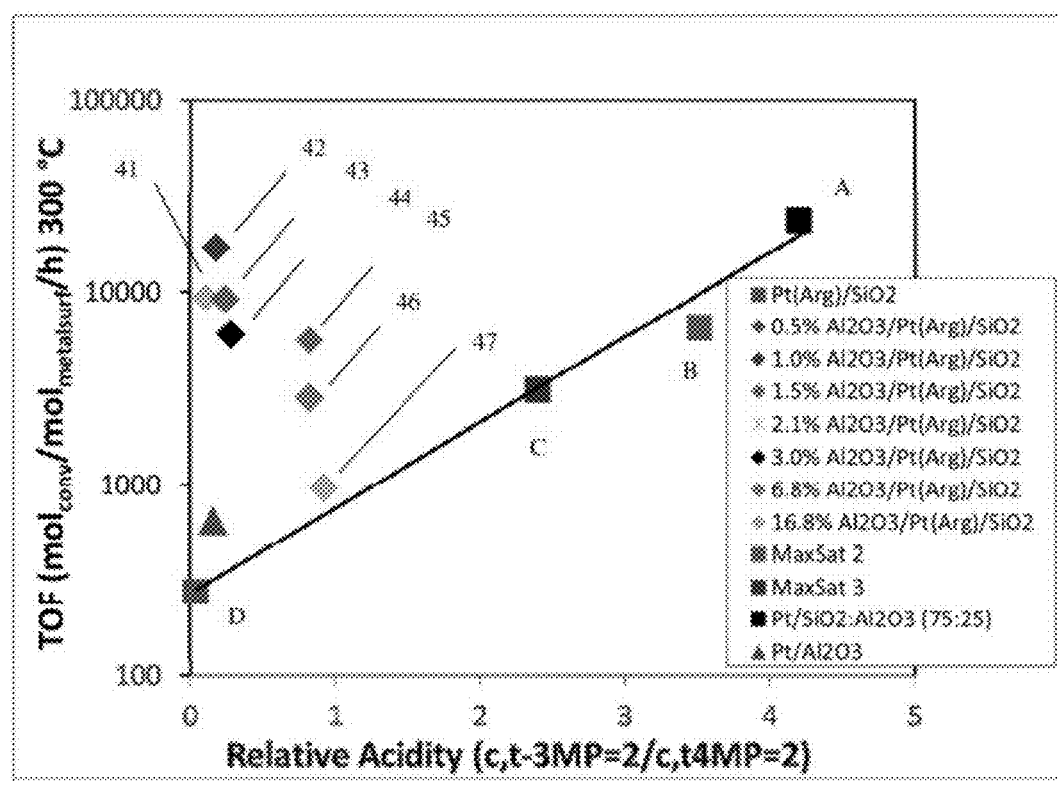
FIG. 4 shows activities for isomerization and cracking of model compounds for various hydrogenation catalysts.

FIG. 4 shows the relative acidity for various samples characterized using the 2MP2 isomerization test. The samples shown as diamonds in FIG. 4 correspond to silica-based catalysts with various amounts of alumina impregnated on the silica substrate. In FIG. 4, Diamond 41 corresponds to ~0.5 wt % $Al_2O_3$; Diamond 42 corresponds to ~1.0 wt % $Al_2O_3$; Diamond 43 corresponds to ~1.5 wt % $Al_2O_3$; Diamond 44 corresponds to ~2.1 wt % $Al_2O_3$; Diamond 45 corresponds to ~3.0 wt % $Al_2O_3$; Diamond 46 corresponds to ~6.8 wt % $Al_2O_3$; and Diamond 47 corresponds to ~16.8 wt % $Al_2O_3$. For comparison, other types of catalysts were also characterized, including a catalyst composed of Pt on an alumina substrate (triangle symbol, similar to Example 1b); a catalyst composed of Pt on silica-alumina substrate (square symbol A, similar to Example 8); two commercially available catalysts corresponding to a combination of Pt and Pd deposited on alumina-bound MCM-41 substrates, the MCM-41 having a silica to alumina molar ratio of about 50:1 (square symbols B and C); and a catalyst composed of Pt on silica without any additional impregnated alumina (square symbol D).

FIG. 4 shows that addition of alumina by impregnation to the silica resulted in increases in the skeletal isomerization rate, with the highest relative turnover frequencies being shown at alumina amounts of about 0.5 wt % (Diamond 41) to about 3.0 wt % (Diamond 45). This rate of isomerization can be increased, however, without causing a substantial increase in overall acidity. As a comparison, use of a catalyst with a silica-alumina substrate (square symbol A) can provide an increase in turnover frequency, but also can result in a substantial increase in the relative number of strong acid sites, as indicated by the increase in the ratio of 3MP2 versus 4MP2 generated for the silica-alumina based catalyst.

It is noted that data points 41, 42, 43, and 44 can correspond to alumina amounts of ~0.5 wt % to ~2.1 wt %. This first grouping of alumina-modified catalysts had roughly comparable acidity levels. Data points 45, 46, and 47 can correspond to a second grouping of alumina-modified catalysts having roughly comparable acidity levels, with a substantially higher acidity than the catalysts corresponding to data points 41, 42, 43, and 44. Without being bound by any particular theory, it is believed that this shift in acidity can represent a transition from having a ratio of tetrahedral to octahedral aluminum atoms of greater than ~1.0 (data points 41, 42, 43, and 44) to a ratio of less than ~1.0 (data points 45, 46, and 47). It is believed that this shift can occur at about 2.5 wt % of alumina or less, or about 2.2 wt % of alumina or less. This distinction is explained in further detail in Example 16.

Example 11. Toluene Hydrogenation Test in Absence of Sulfur

Figure 5:
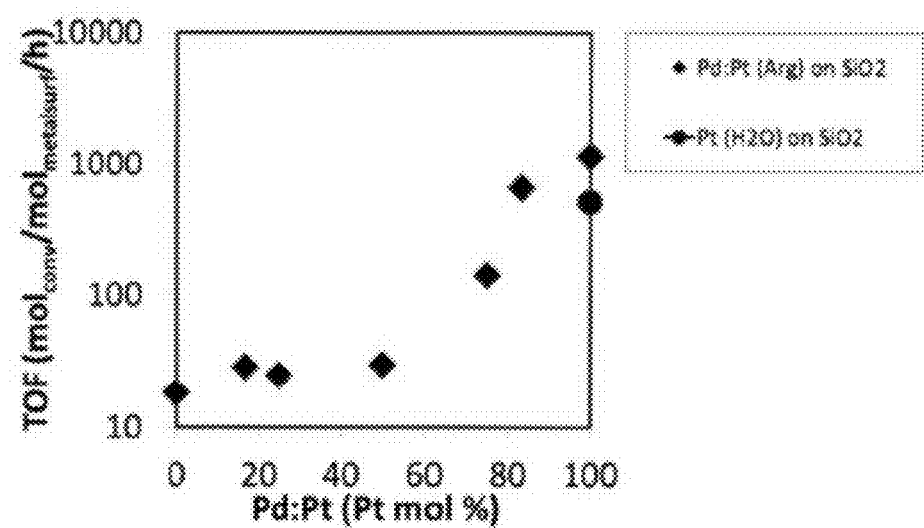
FIG. 5 shows activities for various hydrogenation catalysts in a substantially sulfur free feed.

Samples 6a-6i were evaluated for activity for toluene hydrogenation in a sulfur-free environment by measurement in a (sulfur-free) fixed bed reactor running at ~10 psig of pressure. Each sample was reduced at ~400° C. for ~2 hrs in flowing $H_2$ before the activity measurements. Depending on the activity of the catalyst, the following experimental variables were adjusted within the specified ranges to provide data with <20% toluene conversion: the hydrogen to toluene ratio ($H_2$/Tol) was fixed at ~18; toluene WHSV varied from ~5.4 hr$^{-1}$ to ~8.6 hr$^{-1}$; catalyst mass was ~0.05-0.25 g; and temperature was kept in the range of ~40° C.-120° C. The products were quantified using online GC analysis. The rate data was normalized by the total number of metal sites as determined by O chemisorption and expressed as turnover number (moles of toluene converted per mole of metal surface sites). FIG. 5 shows the turnover number (e.g. activity data) for the various catalysts in samples 6a-6i.

As seen in FIG. 5, the hydrogenation rate was found to increase proportionally with the Pt content when the Pt mol % was greater than 50%, but the rates were constant within experimental error when the Pt mol % was less than 50%. This suggested that the catalyst surface in the low Pt scenario was Pd-rich. As the Pt content exceeded the amount of Pt that can be accommodated in the interior of a metal crystallite, some of the Pt had to be on the surface, and the activity reflected the higher intrinsic activity of Pt. Bimetallic particles with about 50% metal dispersion and about 50 mol % Pt were able to accommodate all the Pd on the surface. In other words, for an approximately 50% dispersion value, approximately half of the metal atoms are on the surface and about half are in the bulk portion of a particle. Without being bound by any particular theory, this suggested that Pd had a stronger proclivity to populate surface sites relative to Pt, so that Pt atoms can preferentially fill surface positions until there are no more available Pd atoms. At that point, Pt atoms can populate the remaining surface positions. Thus, only when there are no more Pd atoms to fill the surface position do Pt atoms populate the surface. This observation was consistent with the notion that Pd-carbon bonding energy was higher than that of Pt-carbon. Based on the data in FIG. 5, without being bound by any particular theory, no electronic promotion effect of the sublayer Pt atoms on Pd was observed.

Example 12. Toluene Hydrogenation in the Presence of S for Pd—Pt on Silica

Samples 6a-6i were evaluated for their toluene hydrogenation activity in the presence of sulfur in a fixed bed reactor. Sulfur was introduced from a ~500 ppmw sulfur solution of dipropyldisulfide in toluene. Dipropyl disulfide can react with hydrogen to provide propane (byproduct) and $H_2S$. The sulfur concentration in the toluene was varied (~125, ~250, ~375, and ~500 ppmw) by co-feeding a clean toluene solution from a second pump. Reactions were performed at ~300 psig. The catalysts were activated at ~400° C. for ~3 hours in flowing $H_2$ before the activity measurements. Unless otherwise specified, the hydrogen to toluene ratio ($H_2$/Tol) was fixed at ~23. Depending on the activity of the catalysts, the following experimental variables were adjusted within the specified ranges to provide data with less than about 20% toluene conversion: Toluene space velocity ($mol_{Tol}/mol_{Metal}/s$) from ~0.19 to ~2.3; catalyst mass≈0.050–0.8 g; and temperature of ~270° C. to ~360° C.

Figure 6:
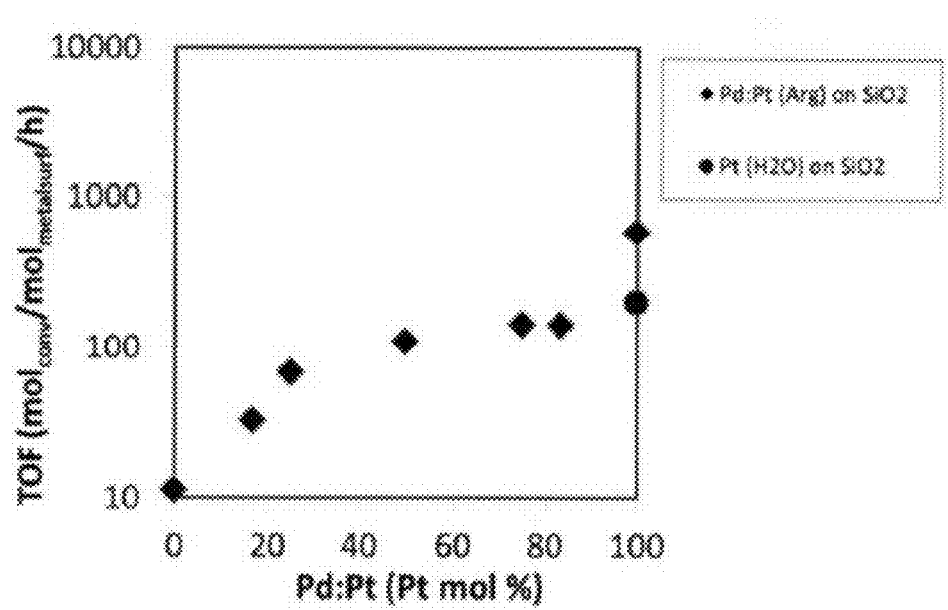
FIG. 6 shows activities for various hydrogenation catalysts in a sulfur-containing feed.

The results for the catalytic tests in the presence of sulfur revealed a similar trend to those without sulfur. The hydrogenation activity appeared to increase in going from pure Pd to pure Pt as shown in FIG. 6, which was contrary to the conventional understanding that a Pd-rich Pd:Pt bimetallic should have increased activity and sulfur tolerance over Pt alone.

Example 13. Toluene Hydrogenation Test for Pt Samples

Catalysts 2, 3a, 3b, 3d, 3e, and 8b were tested for toluene hydrogenation in the presence of sulfur as described in Example 12. The temperatures were adjusted to give comparable conversions where possible. The data are shown in FIG. 7 (sulfur-free feed) and FIG. 8 (feed with ~250 ppmw of sulfur).

Figure 7:
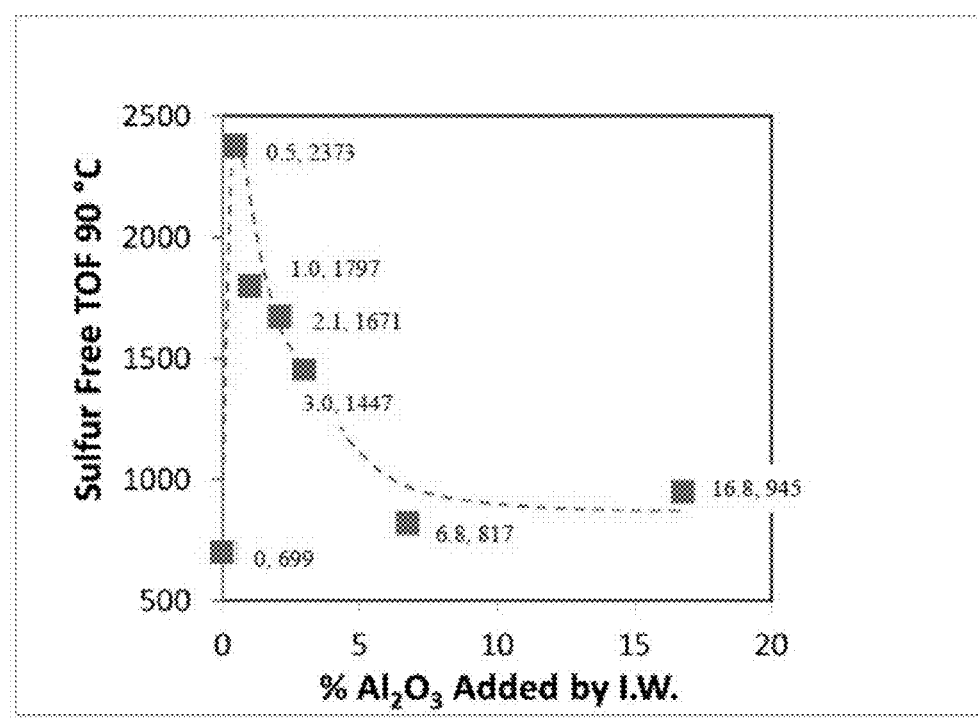
FIG. 7 shows activities for various hydrogenation catalysts relative to an alumina content for the catalysts.
Figure 8:
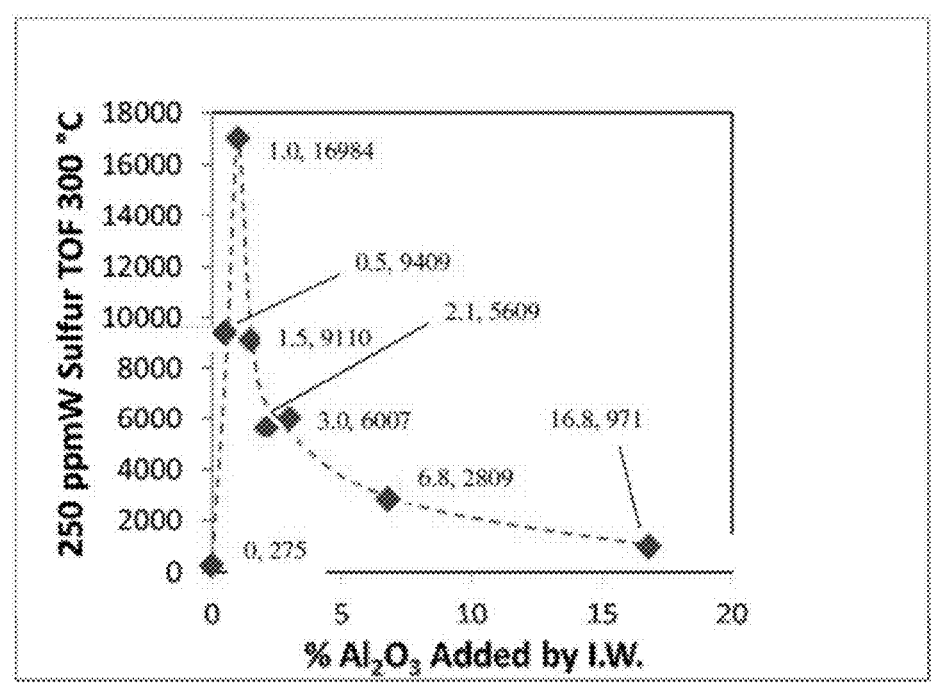
FIG. 8 show activities for various hydrogenation catalysts relative to an alumina content for the catalysts.

The data in FIGS. 7 and 8 shows that the activity per site passed through a maximum with alumina ($Al_2O_3$) additions of about 0.5 wt % to about 2.5 wt %. The location of the peak varied slightly depending on the sulfur content of the feed, with the maximum being between about 0.5 wt % to about 1.5 wt % for a sulfur-containing feed having about 250 ppmw of sulfur (FIG. 8), while the maximum was between about 0.3 wt % and about 1.0 wt % for a substantially sulfur-free feed (FIG. 7). As the amount of added alumina was further increased, the turnover frequencies approached that of catalyst with little or no added alumina. With regard to a comparison to conventional silica-alumina based catalyst, Table 3 shows that, for the samples with low levels of alumina, when the conversions of toluene were adjusted to equivalent levels to the amorphous silica-alumina catalyst at similar temperatures, the cracking of the hydrogenated product (methyl cyclohexane) was reduced. In particular, the silica-based catalysts in Samples 2 and 3 resulted in almost no cracking, while the silica-alumina based catalyst of Sample 8b resulted in a noticeable amount of cracking of methyl cyclohexane.

TABLE 3

Cracking Selectivity of Toluene Hydrogenation

| | | Reaction Results | | |
|---|---|---|---|---|
| Example # | Catalyst Description | % Tol Conv | % MCH Selectivity | Temp (° C.) |
| 2 | Pt(Arg) Arginine prep. | ~11.2 | ~99.8 | ~320 |
| 3a | 1.0% $Al_2O_3$ IW/Pt(Arg) | ~53.7 | ~100.0 | ~300 |
| 3b | 2.1% $Al_2O_3$ IW/Pt(Arg) | ~44.7 | ~99.9 | ~310 |
| 8b | Pt(Arg) SiAl(75-25) | ~54.1 | ~97.4 | ~290 |

Example 14. Comparison of Toluene Hydrogenation in Catalysts

A variety of samples were tested for toluene hydrogenation as in Example 12 in the presence of sulfur. The results are shown in Table 4. The data in Table 4 show that deposition of $Al_2O_3$ on catalysts including both Pd and Pt as hydrogenation metals appeared to have had a similar impact on activity as compared to deposition of $Al_2O_3$ on a catalyst including Pt. However, as the ratio of Pd to Pt increased, the amount of benefit of addition of the $Al_2O_3$ appeared to decrease.

TABLE 4

Toluene Hydrogenation with Pd—Pt and impregnated Al

| Example # | Catalyst Description | Temp (° C.) | Rate mol/ $mol_{cat}$/h | TOF mol/ $mol_{catsurf}$/h |
|---|---|---|---|---|
| 6g | 5Pd:1Pt(Arg) | ~300 | ~13 | ~33 |
| 5h | ~2.0% $Al_2O_3$/5Pd:1Pt(Arg) | ~300 | ~58 | ~300 |
| 6b | Pd(Arg) | ~300 | ~5 | ~11 |
| 5b | ~1.0% $Al_2O_3$/Pd(Arg) | ~300 | ~12 | ~58 |
| 5e | 1Pd:5Pt(Arg) | ~300 | ~64 | ~140 |
| 6e | ~1.0% $Al_2O_3$/1Pd:5Pt(Arg) | ~300 | ~1400 | ~3800 |
| 1a | Pt($H_2O$)/$SiO_2$ Aqueous prep. | ~300 | ~79 | ~200 |
| 5a | Pt($H_2O$)/$SiO_2$ + ~1.0% $Al_2O_3$ post impreg | ~301 | ~1800 | ~5400 |

Example 15. Impact of Variations in Deposition Sequence on Toluene Hydrogenation Samples 3a, 3b, 3b-R, and 7 were tested for toluene hydrogenation as in example 12 in the presence of sulfur. The results of the toluene hydrogenation using samples 3a, 3b, 3b-R, and 7 are shown in FIG. 9 in comparison with the results for toluene hydrogenation using sample 2. The data in FIG. 9 appeared to show that the order of deposition for Pt relative to deposition of the $Al_2O_3$ had little or no impact on the activity for a catalyst.

Example 16. Tetrahedral Versus Octahedral Aluminum Sites

As noted above, without being bound by any particular theory, it is believed that aluminum atoms in tetrahedral sites had a lower acidity than aluminum atoms in octahedral sites, with the result that having an increased ratio of aluminum atoms in tetrahedral versus octahedral coordination sites provided a catalyst with improved hydrogenation activity while reducing/minimizing any increases in cracking activity. The locations of aluminum atoms in a catalyst can be determined using $^{27}Al$ NMR.

$^{27}$Al NMR spectra were recorded on an InfinityPlus™ 500 at 11.74 T, corresponding to $^{27}$Al NMR frequencies of ~130.1 MHz. The samples were loaded in MAS rotors and spun at the magic angle at rates of ~12 kHz. The $^{27}$Al MAS NMR spectra were obtained with a ~π/12 rad pulse length and a recycle delay of ~0.3 seconds. The chemical shifts were referenced with respect to an external solution of Al(H$_2$O)$_6$$^{3+}$ for $^{27}$Al ($\delta_{Al}$=0.0 ppm). All NMR measurements were done at room temperature (~20-25° C.). Peak assignments were made based on peaks between ~70 ppm and ~40 ppm being tetrahedral, peaks between ~20 ppm and ~20 ppm being octahedral, and peaks between ~40 ppm and ~20 ppm being penta-coordinated.

Figure 11:
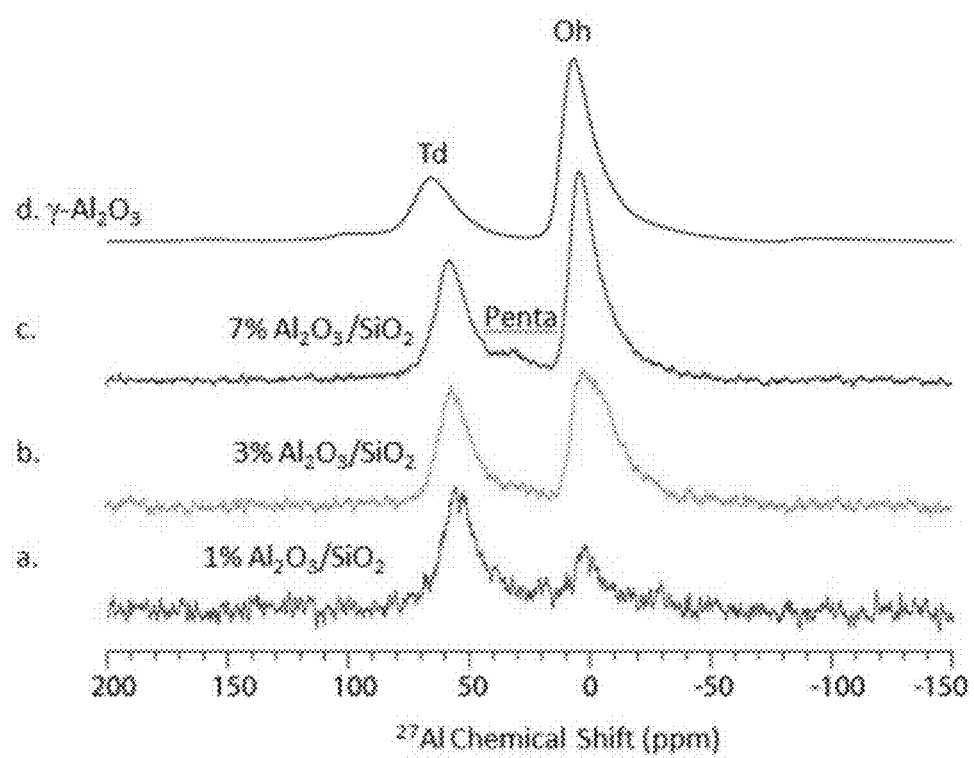
FIG. 11 shows $^{27}Al$ NMR spectra for various supports.

FIG. 11 shows $^{27}$Al NMR spectra of four different catalyst supports. Spectrum "a" (lowest offset in FIG. 11) shows the NMR spectrum for a silica support modified with ~1 wt % alumina, based on impregnation as described in earlier examples. Spectrum "b" corresponds to a silica support modified with ~3 wt % alumina, and spectrum "c" corresponds to a silica support modified with ~7 wt % alumina. Spectrum "d" corresponds to a γ-alumina support. As shown in FIG. 11, increasing the amount of impregnated on a silica support resulted in a relative increase in the height of octahedrally-coordinated alumina. Based on relative peak sizes, it is noted that spectra "b" and "c" were similar to spectra "d" (γ-alumina) for atomic ratio of tetrahedral to octahedral alumina. This similarity was further illustrated in Table 5, which shows the calculated amounts of aluminum atoms in each type of coordination site, as well as the atomic ratios of tetrahedral to octahedral alumina for each of the spectra in FIG. 11.

TABLE 5

Aluminum Coordination Sites

| Sample | Td | Penta | Oh | Td/Oh ratio |
|---|---|---|---|---|
| γ-Al$_2$O$_3$ | ~32% | ~0% | ~68% | ~0.47 |
| ~7 wt % Al$_2$O$_3$/SiO$_2$ | ~34% | ~9% | ~57% | ~0.60 |
| ~3 wt % Al$_2$O$_3$/SiO$_2$ | ~35% | ~8% | ~57% | ~0.61 |
| ~1 wt % Al$_2$O$_3$/SiO$_2$ | ~70% | ~0% | ~30% | ~2.33 |

It is noted that the silica substrates modified with ~3 wt % and ~7 wt % of alumina also showed small but recognizable amounts of aluminum atoms in penta-coordinated sites, which were not observed in the γ-alumina support. These aluminum atoms in penta-coordinated sites appeared to substantially correspond to the difference in the ratio of aluminum atoms coordinated in tetrahedral versus octahedral sites. In Table 5, the ratio of aluminum atoms in tetrahedral versus octahedral sites for the γ-alumina sample was ~0.47, while both of the higher wt % alumina-modified silica samples had a ratio of ~0.6. By contrast, the sample with ~1 wt % alumina on silica had a ratio of aluminum atoms with tetrahedral to octahedral coordination of greater than ~2.0, which demonstrated the clear structural difference between the silica substrate modified with a low content of alumina relative to the silica substrates modified with larger amounts of alumina.

In addition to the above NMR studies, density functional theory calculations were also performed to investigate adsorption stabilization for aromatic compounds at silica surfaces. It was found in the density functional theory calculations that an aromatic compound had enhanced adsorption stabilization when the aromatic compound had two nearest neighbor aluminum atoms with tetrahedral coordination.

Example 17. Diesel Feedstock Testing

The feedstock tested was a sweet diesel feedstock, with the properties summarized in Table 6.

TABLE 6

| Feedstream Properties | |
|---|---|
| Total Hydrogen in Petroleum Products by NMR | ~13.2 |
| API Gravity | ~36 |
| ISL Cloud Point, C | ~-5.7 |
| Total Aromatics in diesel, wt % | ~30.3 |
| Monoaromatics in diesel, wt % | ~22.6 |
| Polynuclear aromatics in diesel, wt % | ~7.7 |
| Antek Sulfur, ppm | ~8 |
| Antek Nitrogen, ppm | ~35 |
| GC Distillation, ° C. | |
| 10% | ~214.2 |
| 20% | ~241.7 |
| 40% | ~279.2 |
| 60% | ~308.6 |
| 80% | ~340.7 |
| 90% | ~360.9 |
| 95% | ~375.9 |

The pilot plant simulated a $2^{nd}$ stage hydroprocessing unit using the sweet diesel feed set summarized in Table 6 with different catalysts. The tests were performed in reactors that were heat traced and steam jacketed with a hydrogen treat rate of ~2000 scf/bbl and a pressure of ~1000 psig. Tests were performed with a diesel feed rate of ~3 hr$^{-1}$ LHSV at temperatures of ~232° C. and ~288° C. for each catalyst.

A comparative catalyst corresponded to ~0.8 wt % Pt supported on a commercially available silica support, which is referred to herein as silica support A. Two alumina-modified catalysts were also prepared by aluminum impregnation via incipient wetness. One alumina-modified catalyst corresponded to an alumina modified version (~1 wt % Al$_2$O$_3$) of ~0.8 wt % Pt on silica support A. The other alumina-modified catalyst corresponded to an alumina modified version (~1 wt % Al$_2$O$_3$) of ~0.8 wt % Pt on the silica support available from Davison described at the beginning of the Examples section. The Davison silica support is referred to as silica support B in this example.

Figure 12:
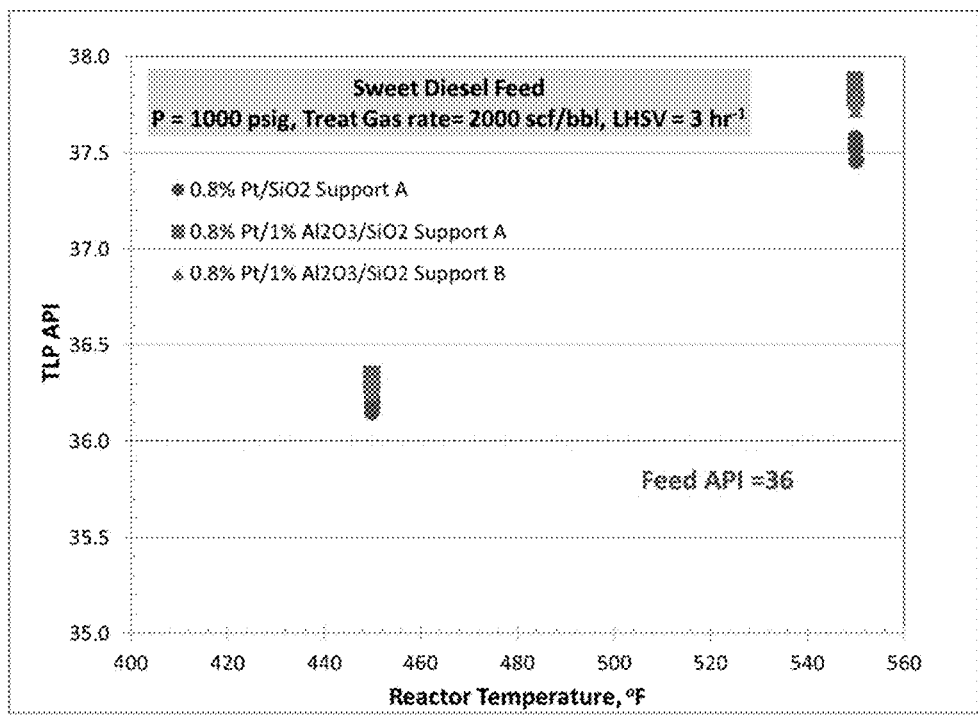
FIG. 12 shows results from aromatic saturation of a diesel feed.
Figure 13:
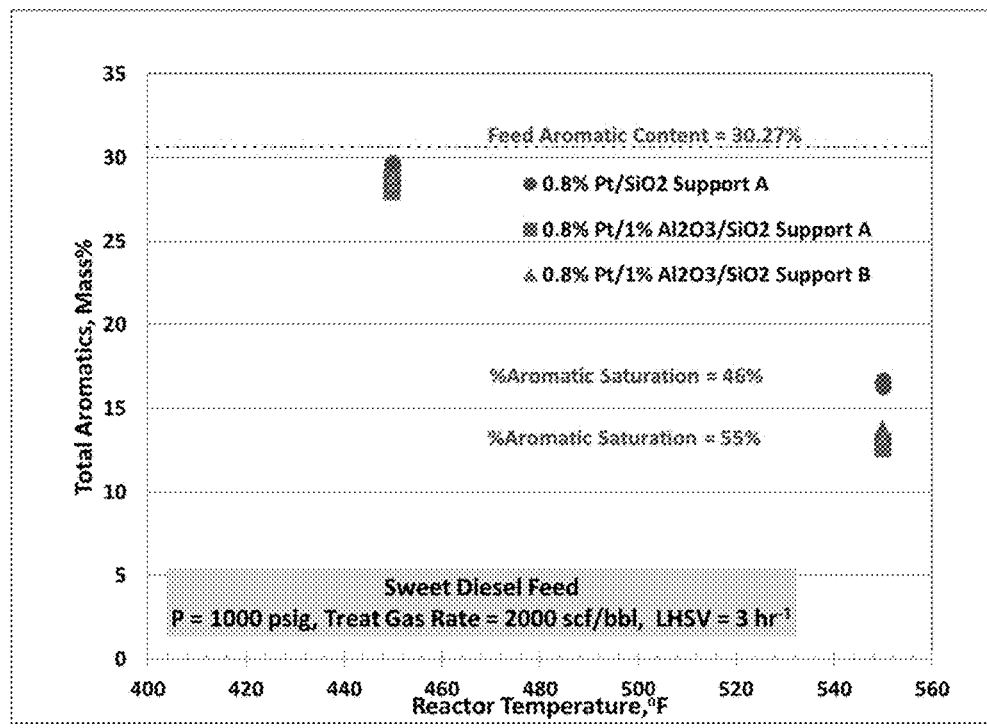
FIG. 13 shows results from aromatic saturation of a diesel feed.

The results of each run are shown in FIGS. 12 and 13, which illustrated the effect that the catalyst had on increasing the API and decreasing the aromatic content of the total liquid product, respectively. As can be seen in FIG. 12, the aluminum modified catalysts exhibited a higher aromatic saturation, as represented by API increase relative to the reference catalyst. Similarly, FIG. 13 shows that aluminum modified catalysts resulted in a greater reduction in the aromatic mass of the total liquid product. The extent of aromatic saturation appeared to increase with increasing of reaction temperatures. No significant cracking activity was observed in the aluminum modified catalysts.

As shown in Table 7, cetane improvement was evaluated based on cetane index calculated using ASTM D976 and D4737. The aluminum modified catalysts appeared to outperform the comparative catalyst and demonstrated significant cetane uplift.

TABLE 7

Summary of Cetane Calculations

| | Cetane Index, D976 | Cetane Improvement | Cetane Index, D4737 (A) | Cetane Improvement | Cetane Index, D4737 (B) | Cetane Improvement |
|---|---|---|---|---|---|---|
| Diesel Feed | ~53.4 | | ~52.6 | | ~53.6 | |
| ~0.8% Pt/~1% Al$_2$O$_3$/SiO$_2$ Support A | ~56.5 | ~3.1 | ~56.3 | ~3.7 | ~57.8 | ~4.2 |
| ~0.8% Pt/~1% Al$_2$O$_3$/SiO$_2$ Support B | ~56.4 | ~3.0 | ~56.3 | ~3.7 | ~57.7 | ~4.1 |
| ~0.8% Pt/SiO$_2$ Support A | ~56 | ~2.6 | ~55.8 | ~3.2 | ~57.2 | ~3.6 |

Volume swell was calculated based on hydrogen consumption and feed and product density. The results are shown in Table 8. The aluminum modified catalysts appeared to outperform the reference catalyst.

TABLE 8

Product Volume Swell

| | Volume Swell (%) |
|---|---|
| ~0.8% Pt/~1% Al$_2$O$_3$/SiO$_2$ Support A | ~1.8% |
| ~0.8% Pt/~1% Al$_2$O$_3$/SiO$_2$ Support B | ~1.8% |
| ~0.8% Pt/SiO$_2$ Support A | ~1.5% |

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for hydrogenating a feedstock, comprising: exposing a feedstock comprising a hydrocarbonaceous feed to a supported catalyst under effective hydrogenation conditions to form a hydrogenated effluent, the supported catalyst comprising 0.1 wt % to 5.0 wt % of a Group VIII noble metal on a silica support, the supported catalyst further comprising about 0.3 wt % to about 2.5 wt % alumina deposited on the silica support, the supported catalyst having a ratio of aluminum atoms in tetrahedral sites to octahedral sites of at least 1.0, wherein the hydrogenation includes saturation of aromatics and/or olefins.

2. The method of claim 1, wherein the hydrocarbonaceous feed comprises a diesel boiling range fraction.

3. The method of claim 1, wherein the hydrocarbonaceous feed comprises equal to or less than about 50 wppm of sulfur.

4. The method of claim 1, wherein the supported catalyst comprises about 0.3 wt % to about 2.1 wt % alumina deposited on the silica support.

5. The method of claim 1, wherein the supported catalyst comprises about 0.5 wt % to about 2.2 wt % alumina deposited on the silica support.

6. The method of claim 1, wherein the effective hydrogenation conditions comprise a temperature from about 75° C. to about 425° C.; a hydrogen partial pressure from about 100 psi (0.7 MPa) to about 3000 psi (20.7 MPa); a liquid hourly space velocity from about 0.1 hr-1 to about 5 hr-1 LHSV; and a hydrogen treat gas rate of from about 36 Sm$^3$/m$^3$ to about 1780 Sm$^3$/m$^3$ (200 SCF/bbl to 10000 SCF/bbl).

7. The method of claim 1, wherein the Group VIII noble metal comprises Pt.

8. The method of claim 7, wherein the Group VIII noble metal further comprises one or more of Pd, Ir, or Rh, a molar ratio of Pt to the one or more of Pd, Ir, or Rh being at least about 1:1.

9. The method of claim 1, further comprising:
processing a stream with a second catalyst under second hydroprocessing conditions to produce a hydrotreated product; and
fractionating the hydrotreated product to obtain the hydrocarbonaceous feed exposed to the supported catalyst.

10. The method of claim 1, wherein the hydrocarbonaceous feed is exposed to the supported catalyst under effective hydrogenation conditions to produce a diesel fuel product having an increased cetane index relative to the hydrocarbonaceous feed, calculated by ASTM D976, by at least 3.0.

11. The method of claim 1, wherein the hydrocarbonaceous feed is exposed to the supported catalyst under effective hydrogenation conditions to produce a diesel fuel product having an increased cetane index relative to the hydrocarbonaceous feed, calculated by ASTM D4737 Procedure A, by at least 3.5.

12. The method of claim 1, wherein the hydrocarbonaceous feed is exposed to the supported catalyst under effective hydrogenation conditions to produce a diesel fuel product having an increased cetane index relative to the hydrocarbonaceous feed, calculated by ASTM D4737 Procedure B, by at least 3.7.

13. The method of claim 1, wherein the hydrocarbonaceous feed has an aromatic content of at least 30 wt %.

14. The method of claim 13, wherein the hydrocarbonaceous feed is exposed to the supported catalyst under effective hydrogenation conditions to produce a diesel fuel product having an aromatic content of about 5 wt % to about 30 wt %.

15. The method of claim 1, wherein the hydrocarbonaceous feed has a T5 boiling point of at least 110° C.

16. The method of claim 1, wherein the hydrocarbonaceous feed is exposed to the supported catalyst under effective hydrogenation conditions to produce a diesel fuel product having a volume swell of at least 1.6% relative to the hydrocarbonaceous feed.

* * * * *